United States Patent [19]

Matsumoto et al.

[11] 4,142,788
[45] Mar. 6, 1979

[54] POWER SOURCE SWITCH FOR USE IN A CAMERA CIRCUIT TO DETECT A FOCUSED CONDITION

[75] Inventors: Seiichi Matsumoto, Yokohama; Hideo Yokota, Tokyo; Mutsuhide Matsuda, Yokohama, all of Japan

[73] Assignee: Canon Kabushiki Kaisha, Tokyo, Japan

[21] Appl. No.: 774,116

[22] Filed: Mar. 3, 1977

[30] Foreign Application Priority Data

Mar. 12, 1976 [JP] Japan .................................. 51-27583
Mar. 12, 1976 [JP] Japan .................................. 51-27584
Jul. 30, 1976 [JP] Japan .................................. 51-91094

[51] Int. Cl.² ...................... G03B 17/20; G03B 13/02
[52] U.S. Cl. ................................... 354/53; 354/60 E; 354/195; 354/198; 354/199
[58] Field of Search ............... 354/25, 53, 57, 60 E, 354/60 L, 61, 195, 198, 199, 266, 286, 289, 288, 162–169; 361/165; 200/52 R, 61.58 R; 250/214 P; 352/140

[56] References Cited

U.S. PATENT DOCUMENTS

| | | | |
|---|---|---|---|
| 3,442,193 | 5/1969 | Pagel | 354/25 |
| 3,486,432 | 12/1969 | Norwood | 354/199 X |
| 3,668,342 | 6/1972 | Pritulsky | 200/52 R |
| 3,677,155 | 7/1972 | Bechmann | 354/195 |
| 3,868,700 | 2/1975 | Kuramoto | 354/288 X |
| 3,972,056 | 7/1976 | Tsujimoto et al. | 354/25 |
| 4,031,383 | 6/1977 | Hosoe et al. | 352/140 |
| 4,067,030 | 1/1978 | Kuramoto et al. | 354/165 X |

FOREIGN PATENT DOCUMENTS 45-5827  2/1970  Japan .......................................... 354/61

*Primary Examiner*—L. T. Hix
*Assistant Examiner*—William B. Perkey
*Attorney, Agent, or Firm*—Toren, McGeady and Stanger

[57] ABSTRACT

The present invention relates to a power source used in a camera having a circuit for detecting a focused condition determining the distance at which the focused condition is established. The invention is particularly suited, for preventing careless opening of the power source by providing an operating member on the lens barrel or a light or temperature sensing element either in the lens barrel or in the view finder respectively. In this manner the power supply switch is functionally engaged in the operating member or operates in response to the output of either the light or temperature sensing element so as to close the current supply circuit.

5 Claims, 26 Drawing Figures

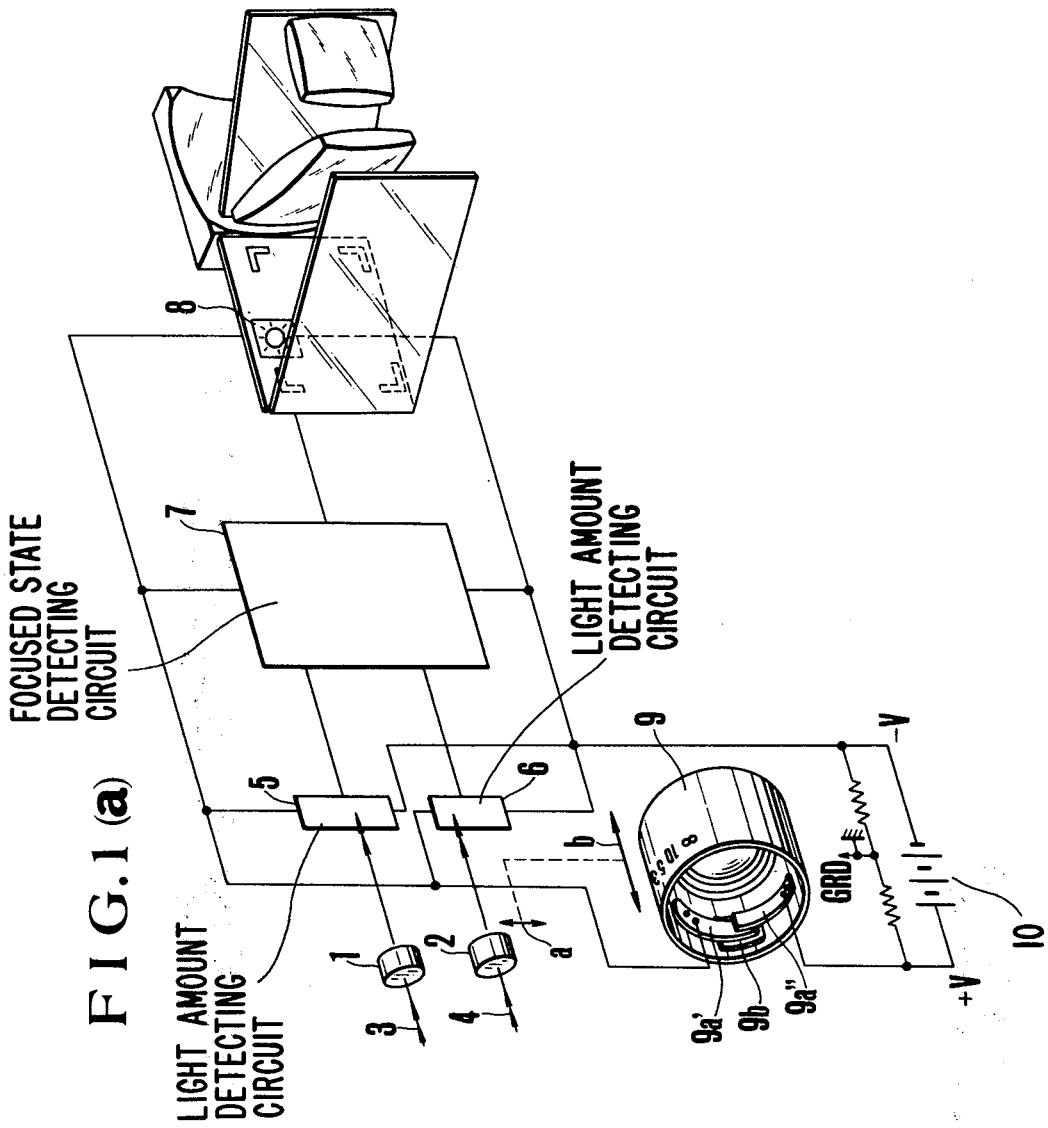

F I G.10
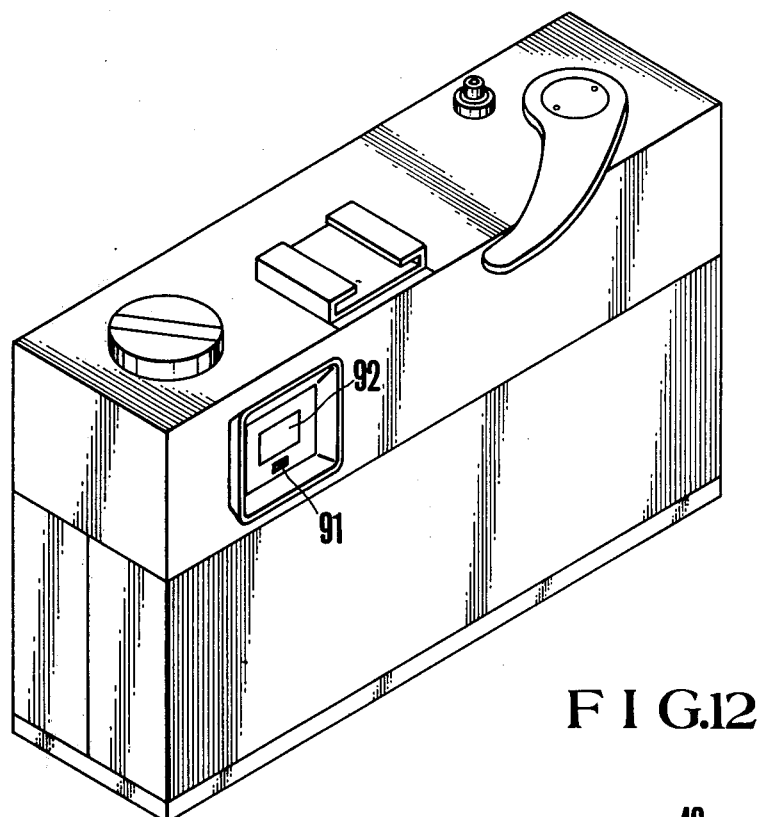
F I G.12
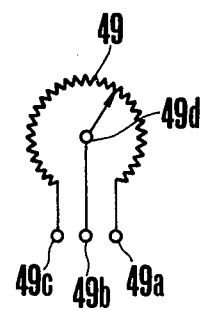

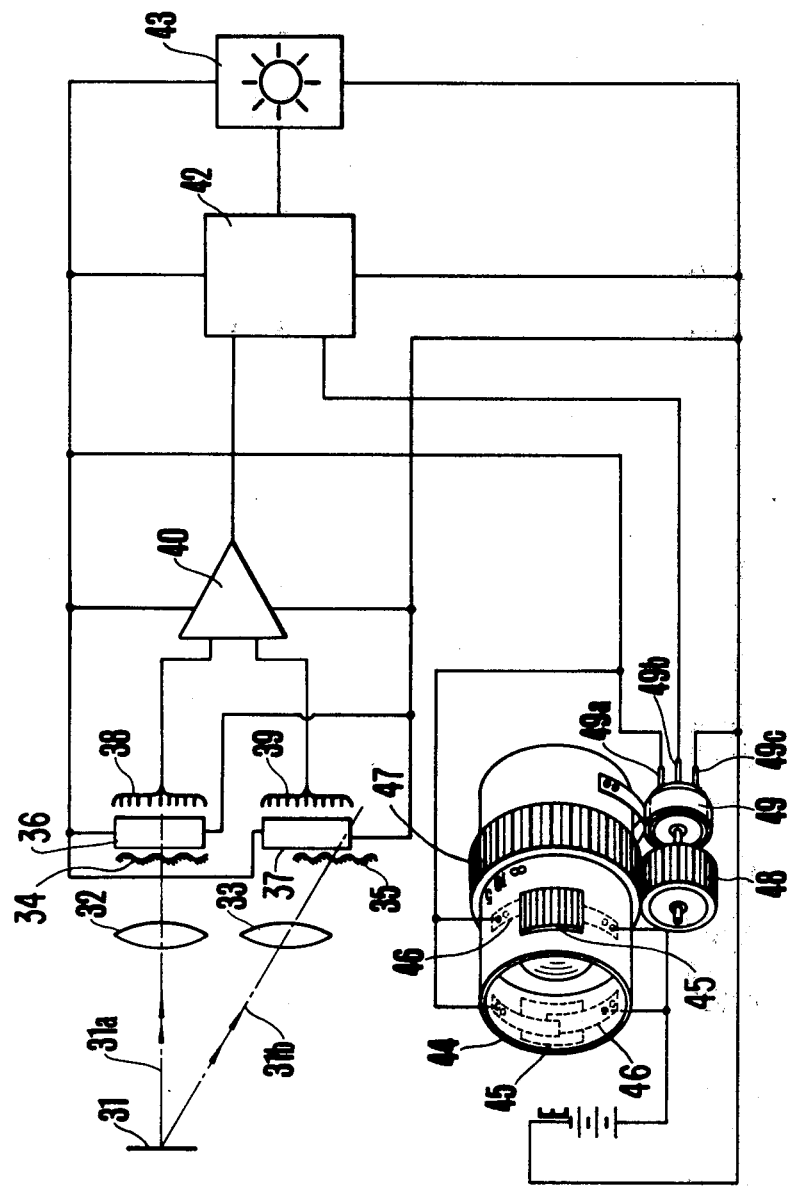

FIG. 13
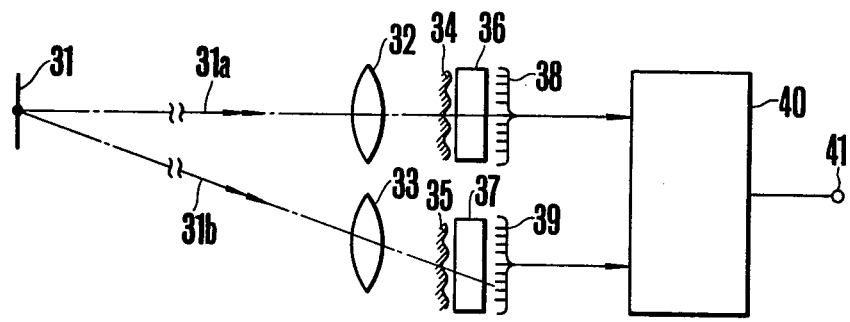
FIG. 14
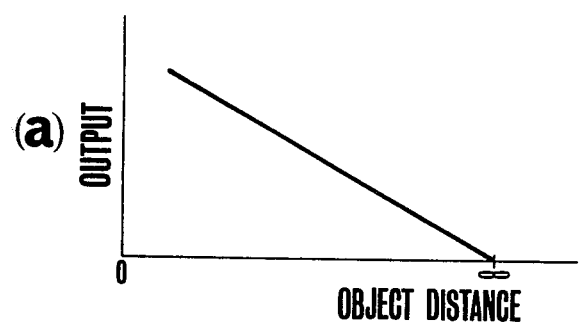
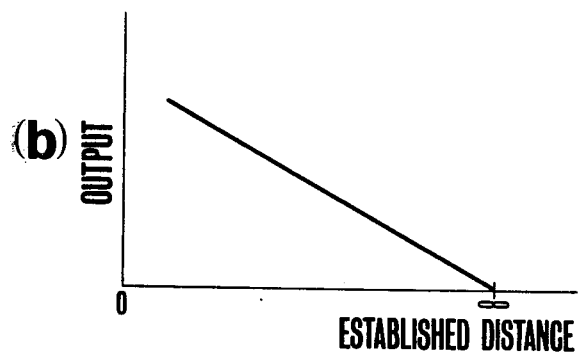

FIG.15
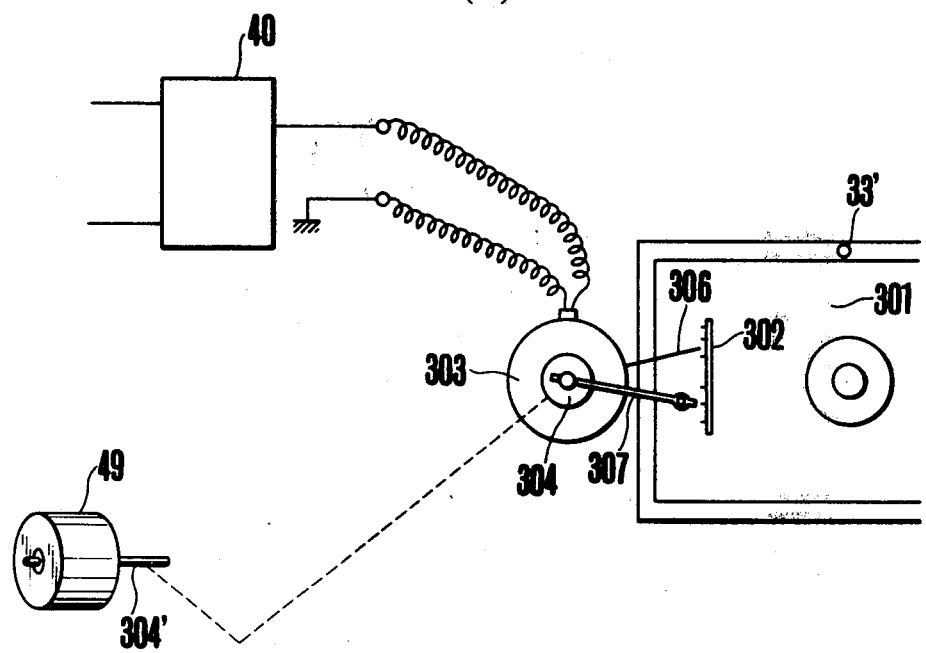
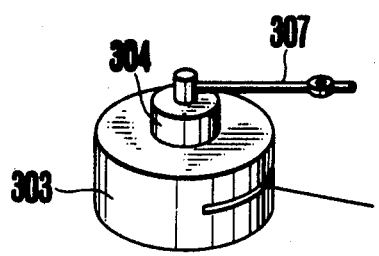

POWER SOURCE SWITCH FOR USE IN A CAMERA CIRCUIT TO DETECT A FOCUSED CONDITION

FIELD OF THE INVENTION

The present invention relates to a power source switch particularly for a camera having a focal point detecting feature.

DESCRIPTION OF PRIOR ART

Until now the opening and the closing of the power source switch of a camera is controlled by functional engagement of an operating member provided outside of the camera. Such operating member is usually provided at a position having nothing to do with the elements of the camera which are essential for the photographic operation, such as shutter release. Because the operation of such a member is not always essential for the photographic operation, the duration of operating this member may be longer than the time necessary for photographing, or the operation of the member may be forgotten at the termination of photographing. This often leads to a careless interruption of the power source switch. Thus a power source switch for a camera has been proposed, so that the opening and the closing of the power source switch is controlled in functional engagement with the shutter release button so as to eliminate the above mentioned inconvenience. However, when the power source switch is functionally engaged with the shutter release button, the power source switch can not be applied to a camera having a so called autofocus feature, whereby the distance detecting operation essential before the shutter release operation is automatically carried out by means of the distance detecting circuit. As a result, in case of a camera having a distance detecting ability the opening and the closing of the power source switch is controlled in functional engagement with the operating members provided outside of the camera as in case of the afore mentioned conventional power source switch. Thus in the case of a camera having the distance detecting feature, the interruption of the power source is often forgotten, which is inconvenient.

SUMMARY OF THE PRESENT INVENTION

An object of the present invention is to provide a power source switch which is suited for a camera having a distance detecting feature.

Another object of the present invention is to provide a power source switch provided on the distance ring of a camera so as to insure the supply of current at the time of the distance detecting operation.

Further, another object of the present invention is to provide a switch formed either by a photoelectric or temperature sensing element for the power supply in a camera having a focus detecting feature.

Further, another object of the present invention is to provide a display circuit for displaying the distance detecting operation.

Further objects of the present invention will become apparent from the explanation of the present invention to be made below in detail in accordance with various embodiments of the invention described in connection with the accompanying drawings.

BRIEF DESCRIPTION OF THE DRAWINGS

FIG. 1(a) is a circuit diagram of an embodiment of the circuit for detecting a focused condition in a camera to which the power source switch in accordance with the present invention is applied.

FIG. 10 is a perspective view of the rear of a camera illustrating the disposition of the temperature sensing element shown in FIG. 9 on the camera;

FIG. 11 is a circuit diagram of another embodiment of the circuit for detecting a focused condition of a lens system in a camera to which the power source switch for the detecting circuit in accordance with the present invention is applied;

FIG. 12 is a circuit diagram of an embodiment of the voltage dividing resistance shown in FIG. 11;

FIG. 13 shows the state of the image in a focused condition formed on the photoelectric converting element shown in FIG. 11;

FIG. 14(a) shows the output of the differential amplifier shown in FIG. 11;

FIG. 14(b) shows the output of the voltage dividing resistance shown in FIG. 11;

FIG. 15(a) is a diagram of the mechanism of an embodiment of the display means for displaying the focal point detecting process by means of the distance detecting circuit shown in FIG. 11; and FIG. 15(b) is a perspective view of the meter and the rotary member shown in FIG. 15(a).

DESCRIPTION OF THE PREFERRED EMBODIMENT

Figure 1B:
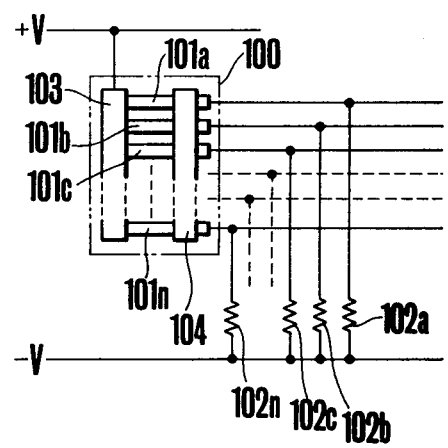
FIG. 1(b) shows a circuit diagram of an embodiment of the circuit for detecting the amount of light shown in FIG. 1(a)

FIG. 1(a) shows the circuit of an embodiment of the power source switch in accordance with the present invention used in the circuit for detecting a focused condition in a camera whereby 1 and 2 are the objective lenses provided at a proper distance from each other on the camera body so as to match the focal point. The objective lens 2 is functionally engaged with the distance ring 9 having the photographic lens 25 of the camera for translation along the direction of arrow a along with the translation of the distance ring 9 along the direction of the arrow b as a result of the focusing process by means of the distance ring 9 for determining the distance of the objective lens 1, constituting the optical system of a so called double image matching system range finder. 5 and 6 are respectively a light receiving means formed by a circuit for detecting the amount of light (referred to hereinafter as either a "light amount detecting circuit" or "photoelectric connecting means") having a group of photoelectric converting members being so designed that the detecting circuits sense the light beams 3 and 4 from the object through the objective lenses 1 and 2 so as to form the image of the object on the group of the photoelectric converting elements. The patterns of the images formed on the groups of the photoelectrical converting elements become identical with each other when a focused condition is obtained in accordance with the principle of the double image matching system range finder.

7 is the detecting circuit for detecting a focused condition ("focused state detecting circuit") by means of the outputs of the afore mentioned light amount detecting circuits 5 and 6 so as to produce an output in the form of a focused state signal. 8 is a display element (such as an LED) for displaying the existence of a focused condition in response to the output or focused state signal of the detecting circuit 7. A pressing member 9b is provided on the external surface of the afore mentioned distance ring 9 while on the internal surface of the distance ring a movable contact piece 9a' and a fixed contact piece 9a" consisting of spring members and so on are secured. The movable contact 9a' is so designed as to be brought into contact with the fixed contact 9a" under pressure, being urged by means of the afore mentioned pressure member 9b. 10 is the power source for supplying current to the circuit when the afore mentioned contact pieces 9a' and 9a" are in contact with each other. A normally opened switch is thereby formed between the power source 10 and the detecting circuit 7 by the contact pieces 9a', 9a" and the operating member 9b for closing the switch to supply current to at least the detecting circuit 7.

FIG. 1(b) shows the circuit of an embodiment of the light amount detecting circuits 5 and 6 shown in FIG. 1(a), whereby 100 is a group of photoelectric converting elements while 101a–101n are respectively photoelectric converting elements consisting of a x CdS – n x CdS, the elements being respectively connected to the resistances 102a–102n. 103 is the electroconductive holding member while 104 is the insulation holding member.

Figure 1D:
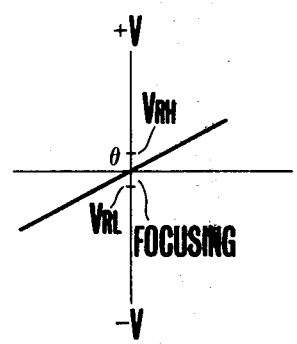
FIG. 1(d) shows the wave form of the output of the amplifier 65 shown in FIG. 1(c)
Figure 1E:
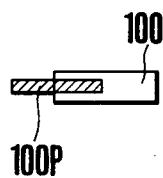
FIG. 1(e) shows the formed state of the image on the photoelectric converting element in FIG. 1(b)
Figure 1F:
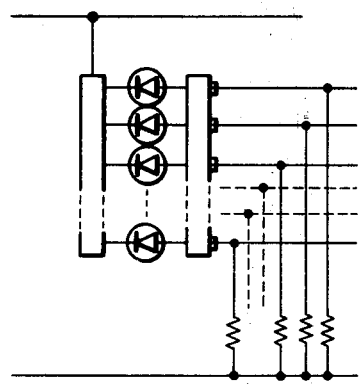
FIG. 1(f) is a circuit diagram of an other embodiment of the circuit for detecting the amount of light in FIG. 1(a)
Figure 1C:
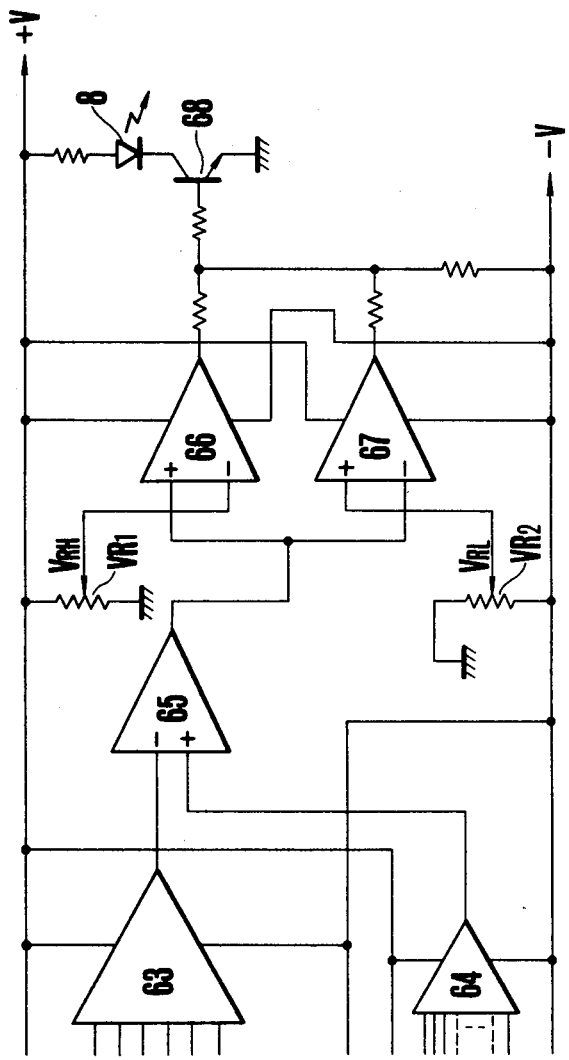
FIG. 1(c) is a circuit diagram of an embodiment of the detecting circuit shown in FIG. 1(a)

FIG. 1(c) shows the circuit of the detecting circuit 7 shown in FIG. 1(a). Here 63 is a summing amplifier connected to the output terminal of the afore mentioned light amount detecting circuit 5, 64 a summing amplifier connected to the output terminal of the afore mentioned light amount detecting circuit 6, 65 is a differential amplifier whose input terminals are connected to the output terminals of the summing amplifiers 63 and 64, and 66 and 67 are comparators. A a positive standard voltage $V_{RH}$ is applied to the inversing input terminal of the comparator 66. Further a negative standard voltage $V_{RL}$ is applied to the non-inversing input terminal of the comparator. 68 is a transistor whose base is connected to the output terminals of the comparators, while 8 is an LED.

Before explaining an operation of an embodiment of the present invention shown in FIG. 1, the principle of the double image matching system will be explained below in accordance with the double image matching system range finder shown in FIG. 2.

Figure 2:
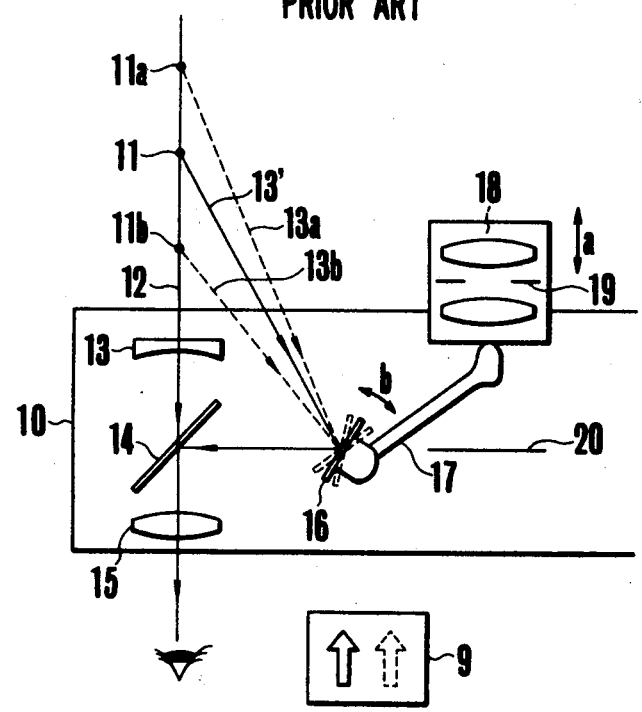
FIG. 2 illustrates the principle of the range finder of a double image matching system.

In FIG. 2, 10' is the camera body, 11 an object at an optical distance, 11a and 11b respectively the object 11 at a larger and a smaller distance along the optical axis, 12 the light beam from the object, 13 the objective lens, 14 the half-permeable mirror, 15 the eye piece lens, 16 the totally reflecting rotary mirror, 17 the helicoid screw connecting lever, 18 the photographic lens, 19 the shutter, and 20 the film plane. The light beam 12 coming from the object 11 reaches the human eye through the objective lens 13, the half-permeable mirror 14 and the eye piece lens 15 on the one hand and the light beam 13' coming from the afore mentioned object 11 is reflected by means of the totally reflecting rotary mirror 16 and the half-permeable mirror 14 and reaches the human eye through the eye piece lens 15. When now the photographic lens 18 is moved along the direction of the arrow a so as to form the image of the object 11 correctly on the film plane 20, the image by means of the afore mentioned light beams 12 and 13' coincide with each other and reach the human eye. When the object 11 is at 11a or 11b, the light beam from the object travels along the path 13a or 13b as is shown in the drawing. Light beam 13a or 13b is reflected by the totally reflecting rotary mirror 16 and the half-permeable mirror 14 and reaches the human eye through the eye piece lens 15, making a double image as is shown by the arrows in 9. By means of advancing or withdrawing the photographic lens 18 so as to rotate the totally reflecting rotary mirror 16 along the arrow b and to make the double image into a single image, the amount of translation of the photographic lens 18 to obtain a correct image on the film plane is determined.

Below the operation of the embodiments of the present invention shown in FIG. 1(a), (b) and (c) will be explained in accordance with FIG. 1.

First, distance ring 9 is operated for the range finding operation for photographing an object. When operating or the pressing member 9b provided on the external surface of the distance ring 9 is pushed down, the contact pieces 9a' and 9a" are brought into contact with each other closing the switch to connect the power source 10 to the circuit for detecting a focused condition and to bring the detecting circuit into the operable state. Thus in accordance with the distance set by means of the distance ring 9, the interval between the objective lens 1 and 2 is determined, while on the group 100 of the photoelectric converting elements on the light amount detecting circuit 6, the image of the object is formed in accordance with the principle of the double image matching system range finder explained in accordance with FIG. 2. Thus the light amount detecting circuits 5 and 6 produce the same outputs when the distance set by means of the distance ring 9 corresponds to the object distance so as to reach a focused condition, whereby the focused state signal is produced by the detecting circuit 7 and the fact that the object is in focus is displayed by means of the display means 8. The process of producing the focused state the signal by means of detecting circuit 7 will be explained in detail in accordance with FIG. 1(c). In the non-focused condition the outputs of the light amount detecting circuits 5 and 6 do not coincide with each other. Namely, in case the image is formed at the position of the group 100 of the photoelectric converting elements constituting the light amount detecting circuit 5 as is shown in FIG. 1(b), the image to be formed on the group of the photoelectric converting elements constituting the light amount detecting circuit 6 assumes the same position as 100p of the image formed on the photoelectric converting element group constituting the light amount detecting circuit 5 only when the distance set by the distance ring 9 corresponds to the object distance, namely only in the focused condition and otherwise assumes another position than 100p so that the output of the amplifier 63 for the light amount detecting circuit 5 is higher in potential than that of the amplifier 64 for the light amount detecting circuit 6. Thus in the focused condition the differential amplifier 65 products "0" as is shown in FIG. 1(d), while the more distant the set distance is from that in the focused condition, the more absolute value of the output is produced. The output of the differential amplifier 65 is compared by means of the comparators 66 and 67 in such a manner that the transistor 68 is opened only when the output of the differential amplifier 65 is between the determined values $V_{RH}$ and $V_{PL}$, whereby the LED 8 is distinguished to display that the object is in focus. When the output of the differential amplifier 65 is between $V_{RH}$ and $V_{RL}$ in the focused condition, the comparators 66 and 67 produce "0" (at low level) so that the transistor 68 is opened whereby the LED 8 is distinguished so as to display the focused condition. When the output of the differential amplifier 65 is higher than $V_{RH}$, the comparator 66 produces "1" (high level) so that the transistor 68 is closed whereby the LED 8 lights up so as to display a non-focused condition. Further, when now the output of the differential amplifier is lower than $V_{RL}$ the comparator 67 produces "1" so that the LED 8 lights up in the same way. Only when by means of the above mentioned operation the outputs of the light amount detecting circuits 5 and 6 are nearly same, i.e., only in the focused condition, the LED 8 is distinguished so as to display the focused state. Further it is also possible to adjust the accuracy of the circuit for detecting a focused condition by determining the value of $V_{RL}$ and $V_{RH}$ correspondingly.

FIG. 1(f) shows another embodiment of the light amount detecting circuit shown in FIG. 1(b), whereby as light sensing elements photovoltaic elements such as silicone blue cell are used instead of CdS. It should be apparent that the same operation as that of the detecting circuit in FIG. 1(b) can be obtained by the detecting circuit in FIG. 1(f).

Figure 3A:
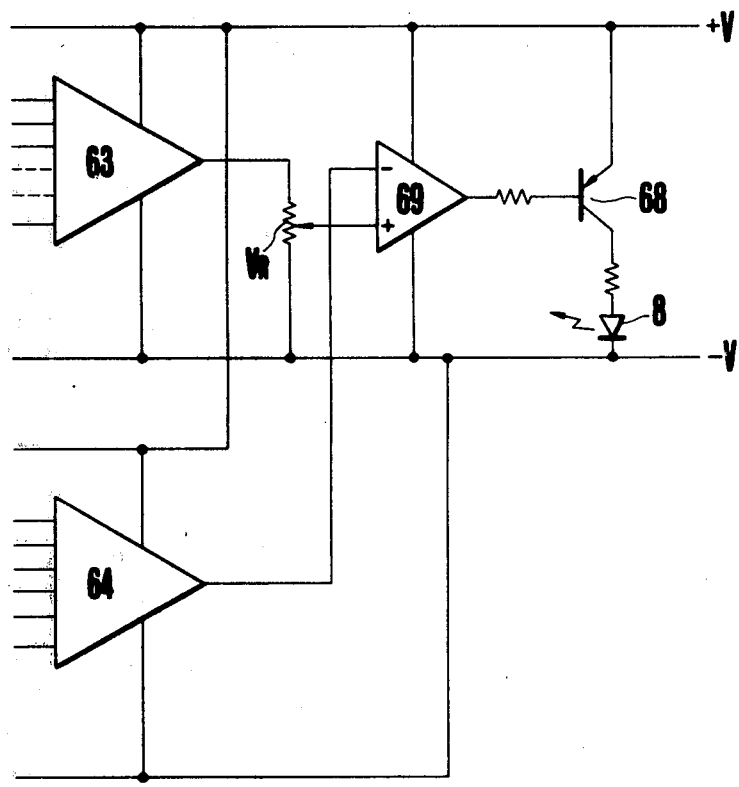
FIG. 3(a) is a circuit diagram of another embodiment of the detecting circuit 7 shown in FIG. 1(a).

FIG. 3(a) shows the circuit of another embodiment of the detecting circuit 7 shown in FIG. 1(a). The same components as those in FIG. 1(c) are indicated by the same reference numerals. In this embodiment the output terminal of the amplifier 64 is connected to the inversing input terminal of the comparator 67 while the output terminal of the amplifier 63 is connected to the non-inversing input terminal of the comparator 67.

Below the operation of the embodiment shown in FIG. 3(a) will be explained.

Figure 3B:
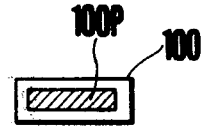
FIG. 3(b) shows the state of the image in a focused condition on the photoelectric converting element in FIG. 3(a)
Figure 3C:
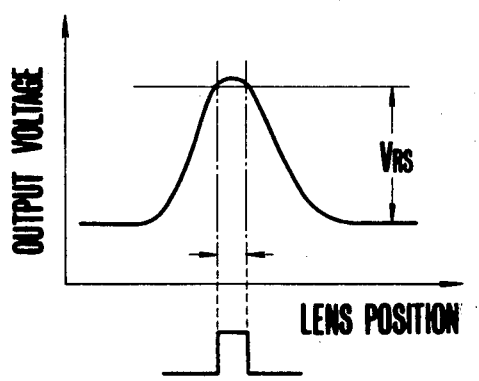
FIG. 3(c) shows the wave form of the output of the amplifier 64 in FIG. 3(a)

When the image 100p is formed on the photoelectric converting element group 100 of the light amount detecting circuit 5 as is shown in FIG. 3(b), the image 100p is formed on the photoelectric converting element group of the light amount detecting circuit 6 only in the focused condition as is shown in FIG. 3(b). Thus the output of the amplifier 64 has a peak in the focused condition as is shown in FIG. 3(c), whereby the output of the amplifier 64 is compared by means of the comparater 69, which produces the output "0" only in the focused condition. Thus the transistor 68 is closed only in the focused state so that the LED 8 lights up only in the focused state.

Figure 4A:
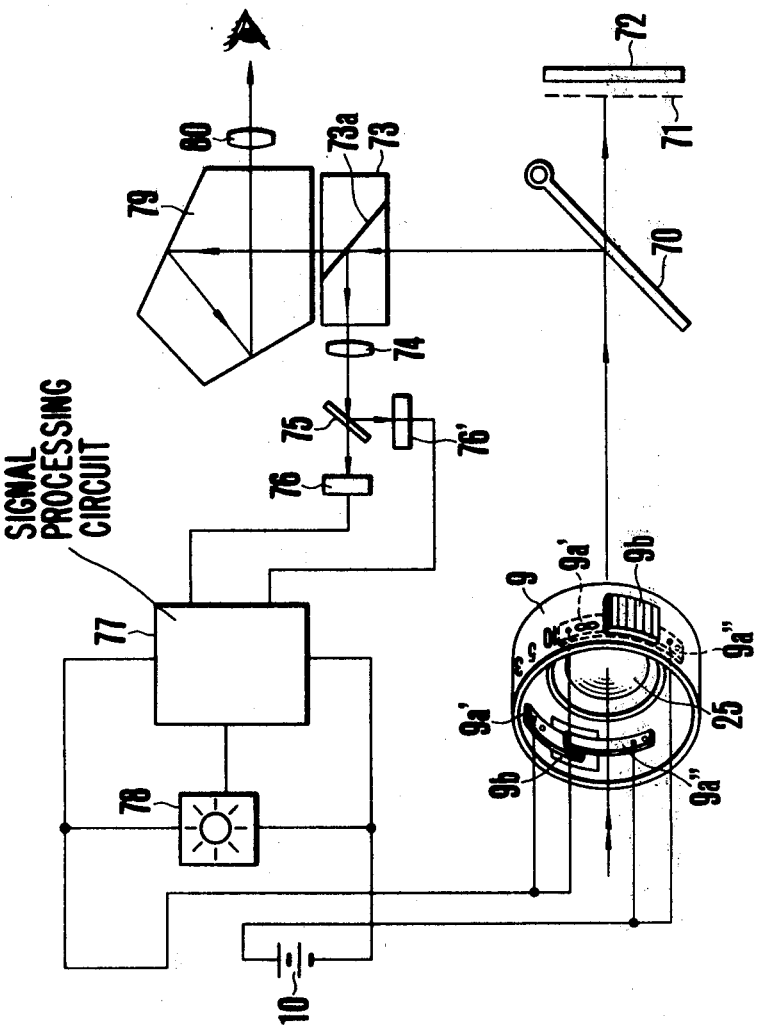
FIG. 4(a) is a circuit diagram of an embodiment of a circuit of the focal point detecting system to which the power source switch in accordance with the present invention is applied.

FIG. 4(a) shows the circuit of an embodiment in which the power source switch for the focused state detecting circuit shown in FIG. 1(a) in accordance with the present invention is applied to the circuit of another focal point detecting system, whereby the same components as those in the embodiment shown in FIG. 1 are indicated by the same reference numerals. In the drawing, 70 is a mirror, 71 a shutter plane, 72 a film and 73 a light beam splitter having a semi-permeable reflecting plane 73a, 74 is the lens, 75 the semi-permeable mirror, 76 and 76' the photoelectric converting elements. 77 is the signal processing circuit for detecting a focused condition by means of the output of the photoelectric converting elements, 78 is the circuit having a display light source for displaying the focused state by means of the output of the signal processing circuit, 79 the pentagonal prism and 80 the eye piece lens. Further, the photoelectric converting elements 76 and 76' are constituted as is disclosed in the Japanese Patent Publication Nos. Sho 41-13669 and Sho 50-112033, whereby the image formed in the neighborhood of the image forming plane of the camera, namely in the neighborhood of the semi-permeable reflecting plane with the light beam through the photographic lens is detected so as to produce an output signal.

Figure 4B:
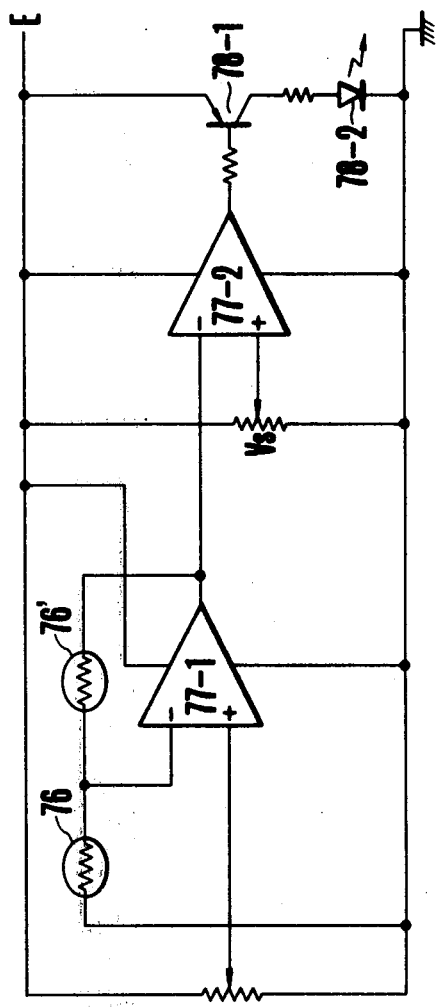
FIG. 4(b) is a circuit diagram of the signal processing circuit 77 and the circuit 78 shown in FIG. 4(a)

FIG. 4(b) shows a circuit of an embodiment of the signal processing circuit 77 and the circuit 78 shown in FIG. 4(a), whereby 76 is the afore mentioned photoelectric converting element disclosed in the afore mentioned patent publications, so designed that the resistance has the minimum value in the focused state, while 76' is so designed as to have the maximum value. 77-1 is the operational amplifier, 77-2 the comparator, 78-1 the transistor and 78-2 the LED.

Figure 4C:
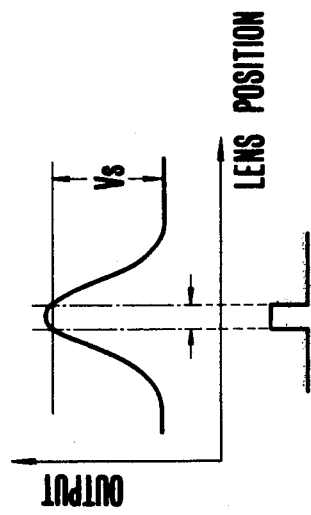
FIG. 4(c) shows the wave form of the output of the amplifier 77-1 shown in FIG. 4(b)

Below the operation of the afore mentioned embodiment will be explained. When the pressing member 9b is pushed down at the time of operating the distance ring 9 in the same way as in the embodiment shown in FIG. 1, the contact pieces 9a' and 9a" are brought into contact with each other, in such a manner that the voltage of the power source 10 is applied to the signal processing circuit 77 so as to bring the circuit into the operable state. Thus, the image of the object is formed in the view finder optical system through the photographic lens at the distance set with the distance ring. When now the image of the object is formed clearly on the image forming plane of the camera by range finding with the distance ring 9, whereby the photoelectric elements 76 and 76' are disposed at the position equivalent to each other, the photoelectric converting elements assume the extreme value while the gain of the operational amplifier 77-1 becomes maximum in such a manner that the output of the operational amplifier 77-1 assumes the maximum value in the focused state as is shown in FIG. 4(c), whereby the comparator 77-2 produces the output "0" and the LED 78-2 light up so as to display the focused state. Further in the present embodiment a plural number of pressing members 9b as well as of the contact pieces 9a', 9a'' are provided in such a manner that the contact pieces are connected parallel to the power source so that even when any switch consisting of any contact pieces 9a', 9a'' does not operate due to some reason, the voltage is applied to the signal processing circuit by means of the remaining switch so as to bring the focal point detecting circuit into operation. In the afore mentioned embodiments, the power source switch is provided on the distance ring so that it is always closed at the time of focusing while when the hand is removed from the distance ring at the termination of the focusing the switch is opened, which is very desirable for the power source switch to the focal point detecting circuit.

Figure 5:
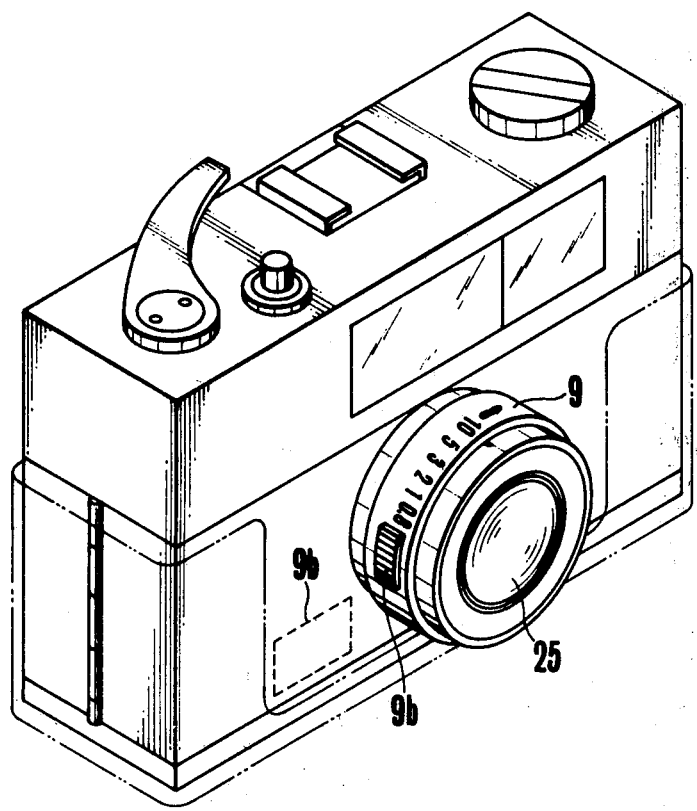
FIG. 5 is a perspective view of a camera illustrating the disposition of the power source switch in accordance with the present invention on the camera.

FIG. 5 shows the disposition of the power source switch in accordance with the present invention for the focused state detecting circuit on the camera in perspective view, whereby 9 in FIGS. 1 and 4 is the distance ring while 9b in FIGS. 1 and 4 is the pressing down member arranged on the distance ring. In the afore mentioned embodiments, the pressing down member 9b is arranged on the distance ring, however, it is possible to obtain the same effect as when the pressing member is provided on the distance ring, even if as is shown in a dotted line, the pressing down member 9b is provided on the front surface of the camera and at the position which is touched by the photographer who holds the camera for photographing, because the current supply to the distance detecting circuit does not need the shutter release.

Figure 6:
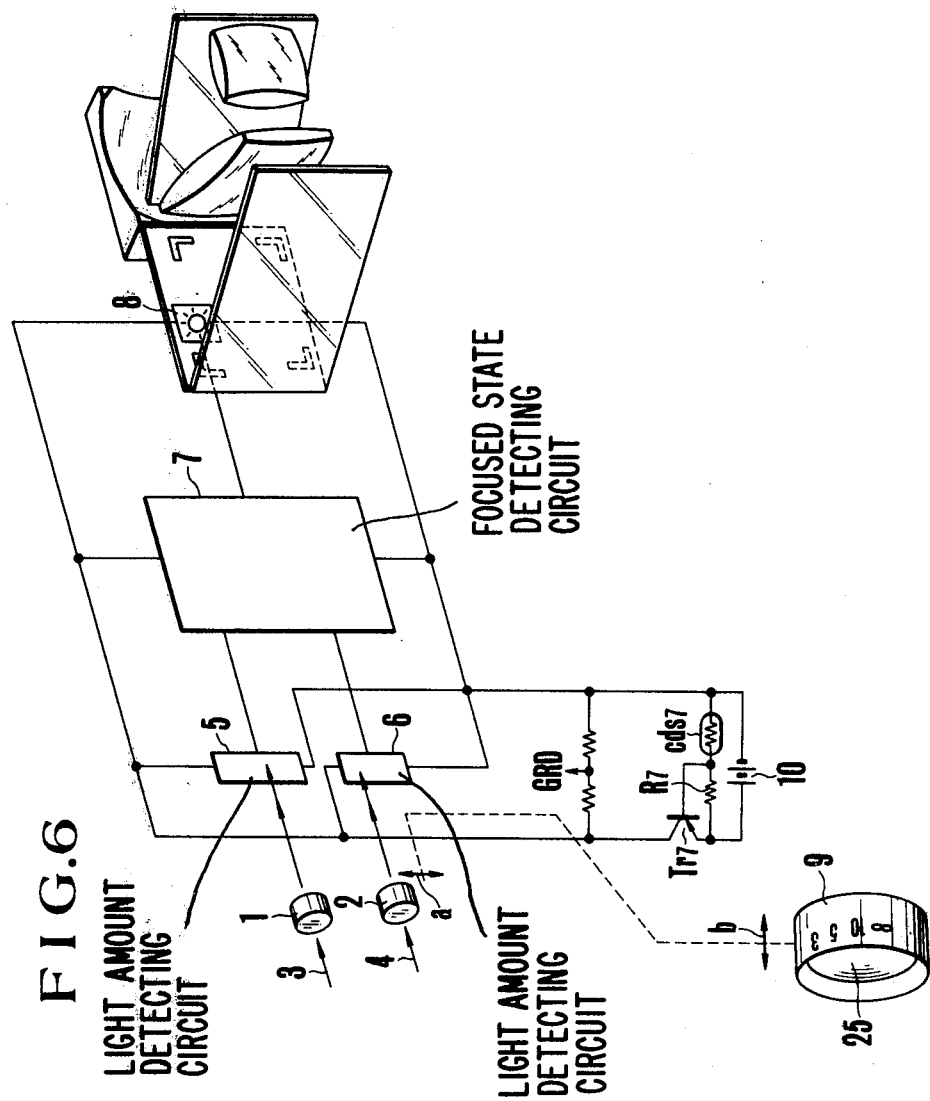
FIG. 6 is a circuit diagram of another embodiment of the power source switch in accordance with the present invention.

FIG. 6 shows the circuit of another embodiment of the power source switch in accordance with the present invention, whereby the same members as those in the embodiment in FIG. 1(a) are indicated by the same reference numerals. In this embodiment the resistance $R_7$ and light sensing means $CdS_7$ are connected parallel to the power source 10 while the transistor $Tr_7$ whose base is connected to the connecting point of $R_7$ and $CdS_7$ is provided.

Figure 7:
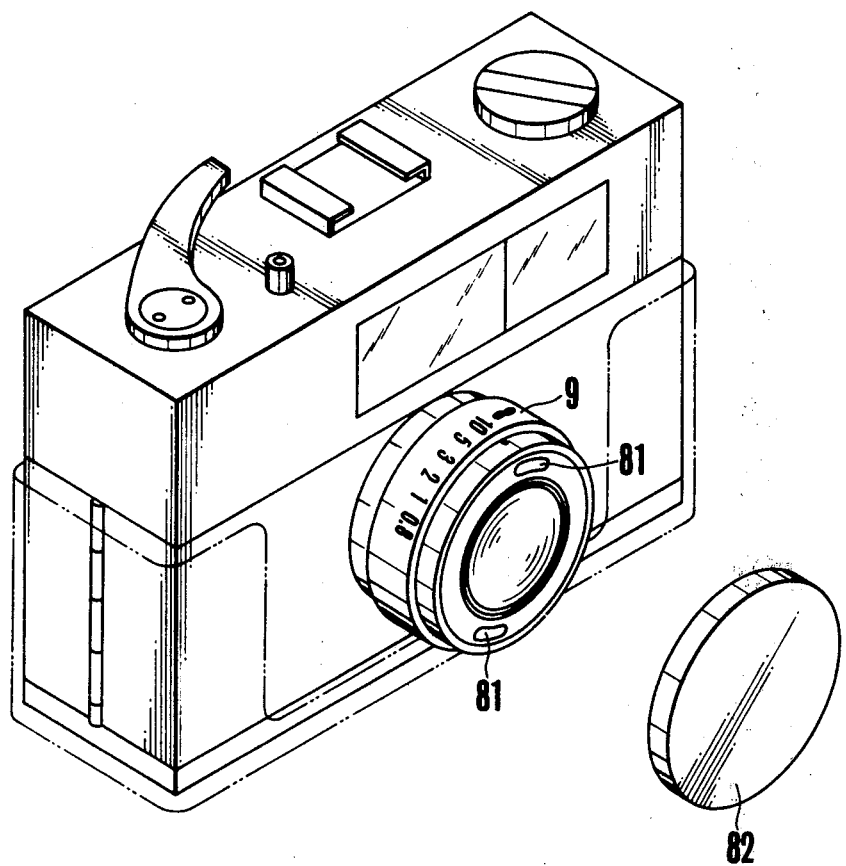
FIG. 7 is a perspective view of a camera illustrating the disposition of the light sensing element of FIG. 6 on the camera.

FIG. 7 shows the disposition of the light sensing element $CdS_7$ in FIG. 6 on the camera in perspective view. Here, 81 is a window arranged on the front surface of the lens barrel of the camera, consisting of a transparent lens and so on, behind which window the afore mentioned light sensing element $CdS_7$ is arranged so as to sense the light beam incident through the window. 82 is the lens cap. When the lens is covered with the lens cap the window is normally shaded, whereby the light sensing element $CdS_7$ produces a high resistance value.

Below the operation of the embodiment shown in FIG. 6 and FIG. 7 will be explained. When the cap 82 is removed from the lens for photographing, the light beam is incident on the light sensing element $CdS_7$ through the window so as to lower the resistance value of the element $CdS_7$ so that the base potential of the transistor $Tr_7$ lowers to close the transistor $Tr_7$. The focused condition is then detected and displayed in the same way as in case of the embodiment shown in FIG. 1(a).

Figure 8:
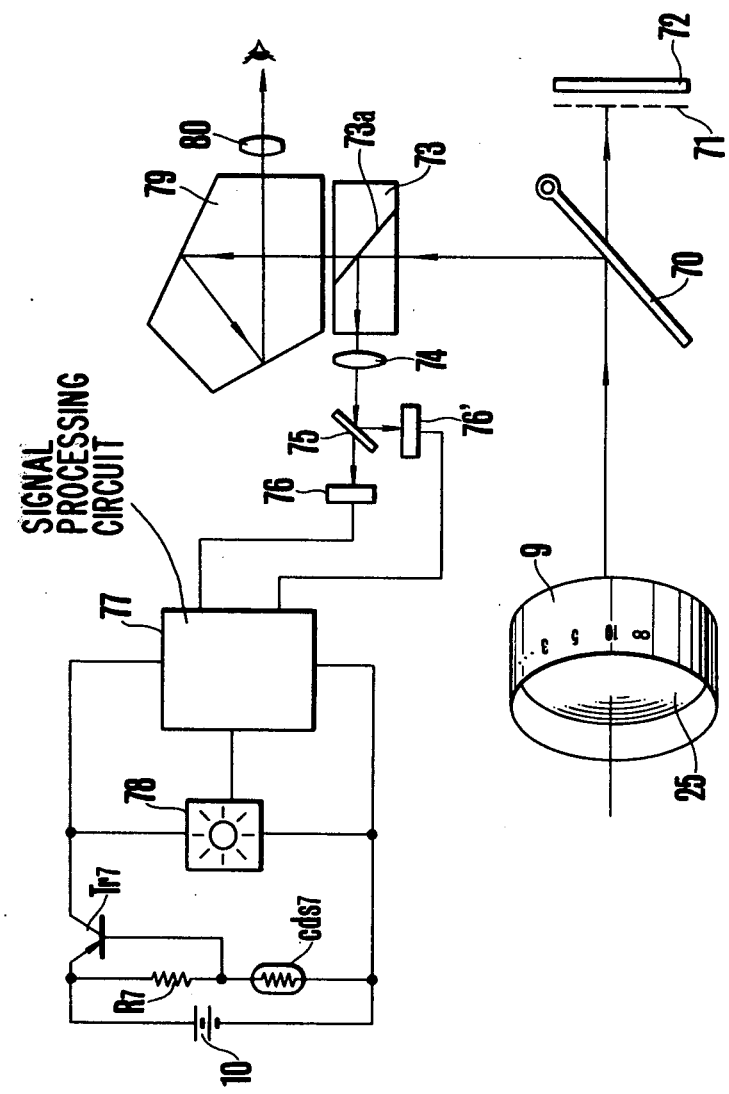
FIG. 8 is a circuit diagram of an embodiment in which the power source switch shown in FIG. 6 is applied to the focal point detecting circuit shown in FIG. 4(a)

FIG. 8 shows the circuit of an embodiment in which the power source switch shown in FIG. 6 is applied to the focal point detecting circuit shown in FIG. 4(a), whereby the same components as those shown in FIG. 4(a) and FIG. 6 are indicated by the same reference numerals. In this embodiment $CdS_7$ is arranged on the back side of the window 81 shown in FIG. 7. The embodiment shown in FIG. 8 is constituted in this way, so that when the cap is removed from the lens, the resistance of $CdS_7$ is lowered in the same way as in case of the embodiment shown in FIG. 6, whereby the transistor $Tr_7$ is closed so as to supply current to the circuits in such a manner that the focused state is detected in the same way as in the embodiment shown in FIG. 4(a).

Figure 9:
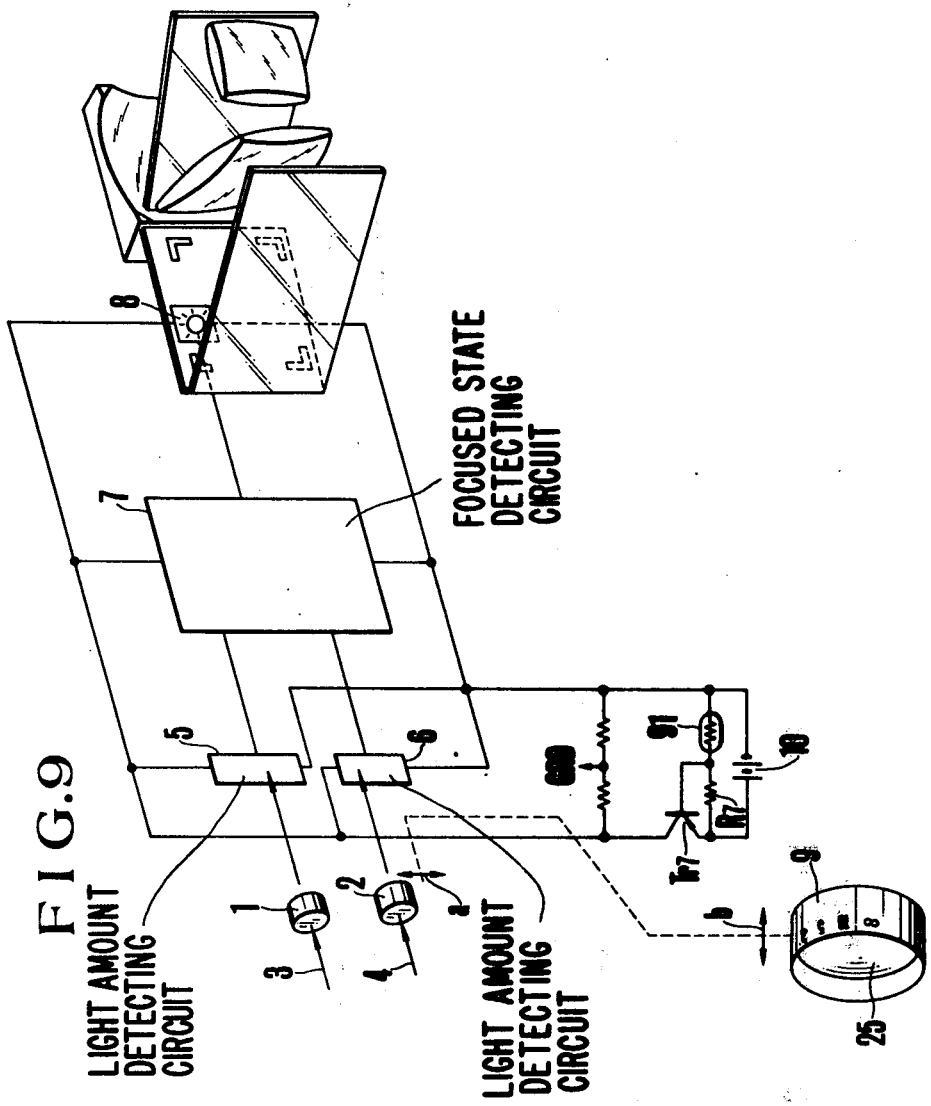
FIG. 9 is a circuit diagram of another embodiment of the power source switch in accordance with the present invention.

FIG. 9 shows the circuit of another embodiment of the power source switch for the focused state detecting circuit in accordance with the present invention, whereby the same components as those shown in FIG. 6 are indicated by the same reference numerals. Here, instead of the light sensing element $CdS_7$, a temperature sensitive element 91 such as thermister is connected to the resistance $R_7$.

FIG. 10 shows the disposition of the temperature sensitive element 91 shown in FIG. 9 on a camera in perspective view. 92 is the view finder while the temperature sensitive element 91 is arranged in the neighborhood of the eye piece lens of the view finder.

Below the operation of the embodiment shown in FIG. 9 and FIG. 10 will be explained. When the photographer looks into the view finder 92, the temperature sensitive element 91 senses the temperature of its photographer so as to lower the resistance value. Thus the transistor $Tr_7$ is closed. Thereafter the circuits operate as is explained in connection with the embodiment shown in FIG. 1(a) in such a manner that the focused state is detected and displayed.

FIG. 11 shows the circuit of an embodiment of the focused state detecting circuit in which the power source switch for the focused state detecting circuit in accordance with the present invention is applied. In this embodiment 31 is the object, 32 and 33 the optical systems for the range finder, 31a and 31b the light beams incident to the optical systems 32 and 33 from the object 31, and 36 and 37 the photoelectric converting means such as of CdS consisting of a plural number of CdS, arranged in the shape of array as is shown in FIG. 1(b). 38 and 39 are the wirings for the output of CdS constituting the photoelectric transducing means 36 and 37, 34 and 35 the patterns of the object image incident on the photoelectric converting means through the optical systems 32 and 33, 40 the differential amplifier being supplied as input signal with the output of the photoelectric converting means as is shown in FIG. 1(c), 44 the lens barrel, 45 the pressing down member arranged on the lens barrel 44 and 46 the contact switch such as of spring member to be closed only with the operation of the pressing down member. 47 is a rack provided on the external circumference of the lens barrel, 48 is a gear to be engaged by the rack, and 49 a voltage dividing resistance connected coaxially with the gear 48. Here the contact position of the contact 49d is variable in functional engagement with the rotation of the gear 48 as is shown in FIG. 12, whereby the voltage produced at the output terminal 49b is determined with the distance set at the photographic lens barrel. 42 is the comparison circuit, whose one input terminal is connected to the output terminal of the afore mentioned differential amplifier 40 and whose other input terminal is connected to the output terminal 49b of the voltage dividing resistance 49. 43 is the display circuit including an LED, being connected to the comparison circuit in such a manner that the afore mentioned LED lights up or is distinguished in accordance with the output of the comparison circuit.

Below the operation of the embodiment shown in FIG. 11 will be explained. When the object is away from the photographic lens at a certain determined distance, a pattern 35 of the object image is formed on the photoelectric converting means 37 as is shown in the drawing. The position of the pattern 35 on the photoelectric converting means 37 is determined only with the object distance, for example, when the object distance is remarkably long, the position of the pattern formed on the photoelectric converting means 36 and 37 is same as is shown in FIG. 13. On the other hand, the position of the pattern on the photoelectric converting means 36 is always the same so that the relative position of the pattern on the means 36 to that on the means 37 corresponds to the object distance. When the pressing down member 45 is pushed down the contact switch 46 is closed whereby the power source E is connected to all of the circuits so that the photoelectric converting circuits 36 and 37 respectively produce an output corresponding to the positions of the patterns on the respective converting means. Because the relative position of the patterns to each other is determined with the object distance as explained above, the difference between the output of the converting means 36 and that of the converting means 37 corresponds to the object distance so that the output of the differential amplifier 40 corresponds to the object distance and applied to the one input terminal of the comparison circuit 42. Further at this time the position of the switch 49d of the voltage dividing resistance 49 has been determined in accordance with the distance set at the photographic lens barrel 44, the output of the voltage dividing resistance 49, namely the output corresponding to the actually set distance is applied to the other input terminal of the comparison circuit 42. When the distance set at the photographic lens barrel coincides with the object distance during the range finding operation by rotating the photographic lens barrel, the comparison circuit 42 produces an output so as to actuate the display LED of the display circuit 43 and display the focused state. The output of the differential amplifier 40 corresponds to the object distance as is explained in accordance with FIG. 14(a), while on the other hand the output of the voltage dividing resistance 49 varies in accordance with the distance set at the photographic lens barrel as is shown in FIG. 14(b) in such a manner that when the actual object distance coincides with the distance set on the lens barrel the input voltages to the comparison circuit coincide with each other so that only in the focused state the comparison circuit 42 produces an output so as to display the focused state.

FIG. 15(a) shows a composition of an embodiment of the follow finger display system for displaying the focused state detecting operation by means of the distance detecting circuit of the embodiment shown in FIG. 11 in the view finder, whereby the same components as those of the embodiment shown in FIG. 11 are indicated by the same reference numerals. In the drawing, 301 is the view field frame finder, 302 distance scale and 303 the distance meter connected to the differential amplifier 40. 306 is the finger of the meter 303, whereby the scaling angle of the finger 306 is determined in accordance with the output of the differential amplifier. 304 is the rotary member to be rotated in functional engagement with the shaft 304' of the afore mentioned voltage dividing resistance, whereby the shaft 304' is rotated along with the rotation of the afore mentioned switch 49d. Further the member 304 is provided coaxially with the meter 303 so as to be rotatable with the meter 303 as is shown in FIG. 15(b), whereby the rotation amount of the member 304 is determined with the rotation amount of the shaft 304', namely the rotation amount of the photographic lens barrel, while the position of the finger 307 secured on the member 304 corresponds to the distance set at the photographic lens barrel.

Below the display by means of the follow finger in the view finder will be explained in accordance with FIG. 15. As afore mentioned, the output of the differential amplifier 40 is determined with the object distance, the scaling angle of the finger 306 corresponds to the object distance and the finger 306 assumes the position corresponding to the object distance on the scale 302. Here the finger 307 assumes the position corresponding to the distance set at the lens barrel on the scale 302. Thus the difference between the position of the finger 306 and that of the finger 307 on the scale 302 corresponds to the difference between the actual object distance and the set distance. It is thereby possible to set the distance capable of obtaining the focused state at the photographic lens barrel by rotating the lens barrel until both fingers coincide with each other. Further as afore mentioned, in the focused state LED 33' lights up, which enables the precise distance detection. Further in the present embodiment the rotary member 304 is functionally engaged with the shaft 304'. It should be obvious that the focused state can be detected in the same way by providing a meter instead of the rotary member 304 in such a manner that the meter is driven with the output of the afore mentioned resistance while the lens barrel is rotated until the finger of the meter and the finger of the meter 306 coincide with each other. Further in the present embodiment a mechanical switch is adopted as a power source switch. A photoelectric switch can therefore be used in the same way as in case of the embodiment shown in FIG. 6.

As explained in detail above, the closing and the opening of the power source switch in accordance with the present invention is controlled by the pressing down member provided on the distance ring, or the light sensitive or the temperature sensitive element provided outside of the camera so as to prevent the careless interruption of the power source switch, which is a very desirable feature for a power source switch for the focused state detecting circuit.

What is claimed is:
1. A photographic camera comprising:
   a) a camera casing;
   b) a lens barrel;
   c) a detecting circuit within said camera for detecting a focused condition and for producing an output corresponding to the focused condition;
   d) a display circuit connected to said detecting circuit for displaying the existence of a focused condition in accordance with the output of said detecting circuit;

e) a power source for energizing at least said detecting circuit;

f) light sensitive means provided in the lens barrel, said means producing an output when the means receives light; and g) a semi-conductor switch connected between the power source and said detecting circuit to form a current supply path from the power source to the detecting circuit in response to the output of the light sensitive means.

2. A photographic camera comprising:

a) a camera casing;

b) a lens barrel;

c) photoelectric connecting means adapted to produce an output responsive to received light;

d) a detecting circuit for detecting a focused condition in accordance with the output of said photoelectric connecting means;

e) a displaying circuit connected to said detecting circuit for displaying the existence of a focused condition in accordance with the output of the detecting circuit;

f) a power source for energizing at least said detecting circuit;

g) light sensitive means arranged in the lens barrel, said means being connected to said power source forming a closed circuit with said power source and producing an output when the means receives light; and h) switching means connected between the detecting circuit and the power source to form a power supply path from the power source to said detecting circuit in response to the output of the light sensitive means.

3. A photographic camera comprising:

a) a camera casing;

b) a view finder part provided on the camera casing;

c) a focused state detecting circuit for detecting a focused condition;

d) a display means connected to said detecting circuit for displaying the existence of a focused condition in accordance with the output of the focused state detecting circuit;

e) a power source for energizing at least said focused state detecting circuit;

f) a temperature sensitive element provided on the view finder part, said element producing a certain determined output in response to the temperature of a human body when a human body is in close proximity thereto;

g) a semi-conductor switch connected between the power source and the focused detecting circuit, said switch being designed to form a current supply circuit to the focused state detecting circuit when the output of the temperature sensitive element reaches said determined value.

4. A photographic camera according to claim 3, wherein said temperature sensitive element is a thermister.

5. A photographic camera comprising:

a) a camera casing;

b) a view finder part provided on the camera casing;

c) photoelectric connecting means;

d) a detecting circuit for detecting a focused condition in accordance with the output of said photoelectric connecting means;

e) a displaying circuit connected to said detecting for displaying the existence of a focused condition in accordance with the output of the detecting circuit;

f) a power source for energizing at least said detecting circuit;

g) a temperature sensitive element connected to said power source forming a closed circuit with the power source and producing an output in response to the temperature of a camera operator when he looks into the view finder; and h) a semi-conductor switch connected between the power source and said detecting circuit to form a current supply path from the power source to the detecting circuit in response to the output of the temperature sensitive element.

* * * * *